United States Patent [19]

Hecker

[11] 4,387,391
[45] Jun. 7, 1983

[54] SATELLITE INSPECTION SYSTEM USING HOVERING-TYPE INTERCEPTORS

[75] Inventor: Klaus J. Hecker, Oberursel, Fed. Rep. of Germany

[73] Assignee: The United States of America as represented by the Secretary of the Navy, Washington, D.C.

[21] Appl. No.: 574,814

[22] Filed: Aug. 24, 1966

[51] Int. Cl.³ .............................................. H04N 7/18
[52] U.S. Cl. .................................... 358/109; 358/125; 102/213
[58] Field of Search ............... 250/199; 178/6, 6.6, 178/6.8, 7.3, 7.6, 7.85; 343/7; 95/15; 244/155, 3.14 T; 358/100, 108, 109, 125; 102/213

[56] References Cited

U.S. PATENT DOCUMENTS

| | | | |
|---|---|---|---|
| 3,090,831 | 5/1963 | Schepler | 358/109 |
| 3,117,314 | 1/1964 | Carroll et al. | 343/7 |
| 3,226,059 | 12/1965 | Paterson et al. | 178/6.8 X |
| 3,258,595 | 6/1966 | Galante | 250/199 |
| 3,305,633 | 2/1967 | Chernoch | 250/199 |

*Primary Examiner*—S. C. Buczinski

[57] ABSTRACT

An electro-optical inspection device for making optical observations of a satellite in space having a stabilized matrix camera with an image tube from which a readout is taken and transmitted through electromagnetic transmitting means to a ground receiving station whenever the camera is directed toward, and at a predetermined distance from, a satellite, as determined by a proximity switching means, to activate the camera and transmitting means for reconstruction of the optical observation at the ground receiving station.

2 Claims, 9 Drawing Figures

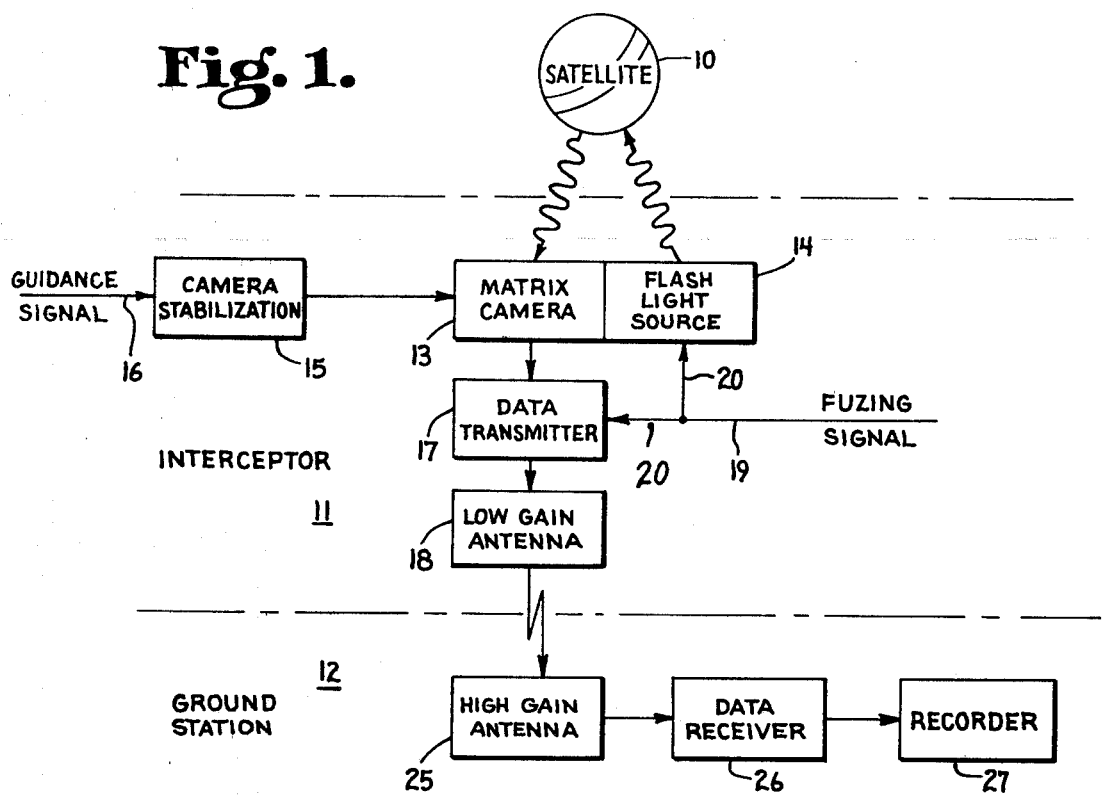
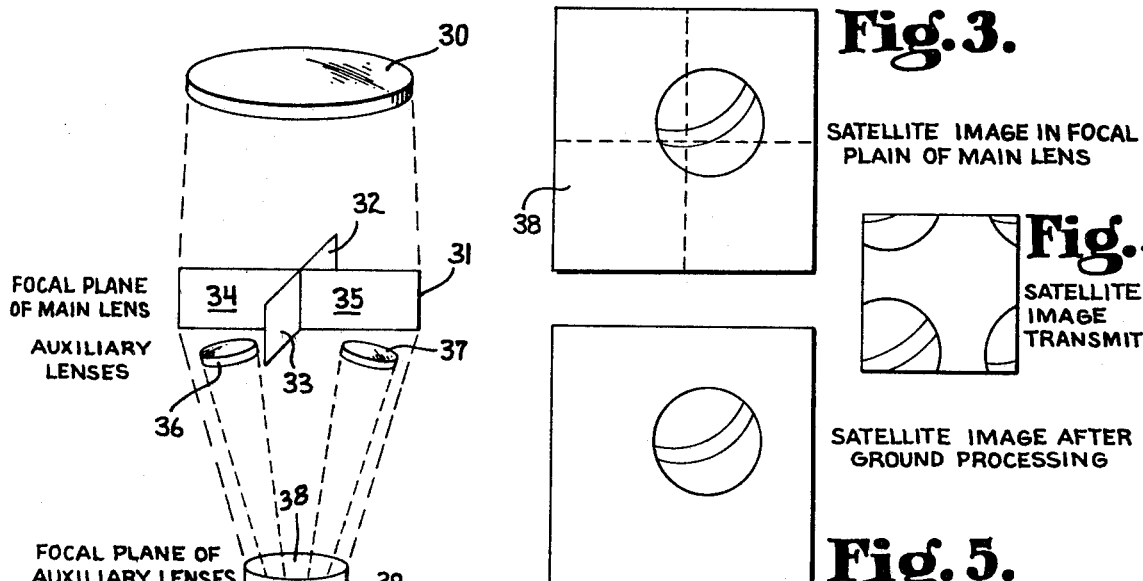

LIMITATION OF EXPOSURE TIME AS A FUNCTION OF RANGE (FIELD OF VIEW = 5 DEG.)

RESOLUTION IN LINES PER SATELLITE DIAMETER AS A FUNCTION OF SLANT RANGE (SAT. DIA. = 2 FT.)

RESOLUTION IN LINES PER SATELLITE DIAMETER AS A FUNCTION OF MISS DISTANCE
SATELLITE DIA. = 2 FT; FIELD OF VIEW = 5 DEG.

MULTIPLE IMAGES OF THE SATELLITE DUE TO MULTIPLE EXPOSURE OF THE ELECTRO-OPTICAL CAMERA

SATELLITE INSPECTION SYSTEM USING HOVERING-TYPE INTERCEPTORS

The invention described herein may be manufactured and used by or for the Government of the United States of America for governmental purposes without the payment of any royalties thereon or therefor.

BACKGROUND OF THE INVENTION

This invention relates to satellite inspection systems and more particularly to an electro-optical system for making optical observations of a satellite in space and of transmitting this optical picture of the satellite by microwave data transmission to a ground station.

In prior systems for visual inspection of satellites in space by hovering-type satellite interceptors, a camera is used to take pictures of the satellite which camera is later dropped to earth. The camera is contained in a recoverable capsule which is released from the interceptor and is protected against the re-entry heat when falling back to earth. It has to be slowed down before it reaches the ground to prevent destruction upon impact. It is subsequently located by search aircraft with the aid of a beacon and recovered. This procedure is not only time consuming, but costly.

SUMMARY OF THE INVENTION

The high-speed electro-optical system of this invention is intended for use in a hovering-type satellite interceptor system which could be employed for inspection and/or destruction of enemy satellites. When used for inspection, a system of this type will provide information on the side of the enemy satellite which is directed toward it, rather than the all-aspect information that would be provided by oribital interceptor systems. This hovering system will provide sufficient information to determine whether or not the enemy satellite should be destroyed. When the hovering system is used to destroy the enemy satellite, the same electro-optical system used for inspection will be employed for strike evaluation. Its strike evaluation will be limited since it is possible that, after detonation of the interceptor warhead, the enemy satallite would continue to orbit, although it would not be in working condition. However, information can be obtained which will permit evaluation of the probable success of the mission by giving accurate information regarding the position of the satellite with respect to the interceptor at the time the warhead is triggered. It is therefore a general object of this invention to provide an electro-optical satellite inspection system used in a satellite interceptor station capable of transmitting pictures of an intercepted satellite in space to an earth station.

BRIEF DESCRIPTION OF THE DRAWINGS

These and other objects and the attendant advantages, features, and uses will become more apparent to those skilled in the art as a more detailed description proceeds when considered in conjunction with the accompanying drawings, in which:

FIG. 1 is a block circuit schematic of a satellite, an interceptor hovering-type satellite in space, and a ground station for electromagnetic communication between ground and hovering satellite;

FIG. 2 is a view of the matrix lens of a matrix camera;

FIG. 3 is a satellite image on the focal plane of the matrix camera;

FIG. 4 is a view of the satellite image transmitted by the interceptor satellite of FIG. 1;

FIG. 5 is a satellite image after receiver processing;

DESCRIPTION OF THE PREFERRED EMBODIMENT

Figure 6:
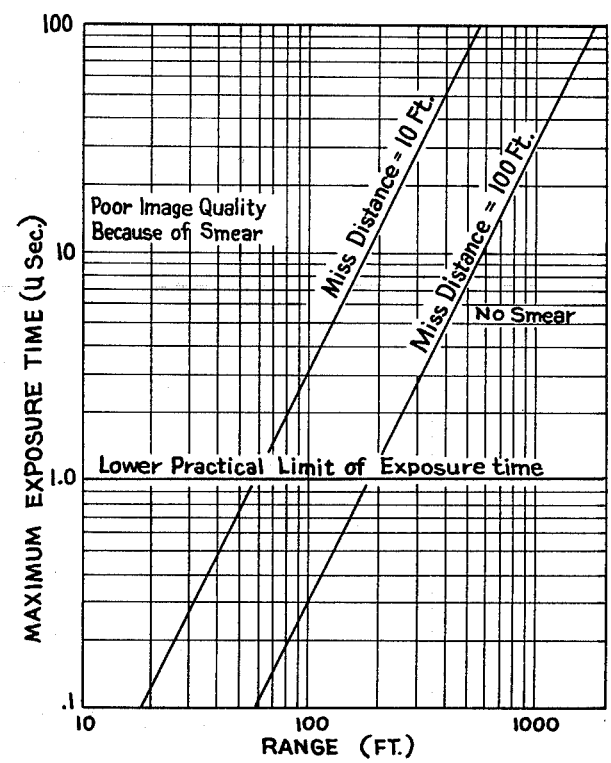
FIGS. 6, 7, and 8 are each graph representations of exposure time, resolution lines per satellite diameter as a function of slant range, and resolution in lines per satellite diameter as a function of miss distance, respectively.

Referring more particularly to FIG. 1 there is shown a satellite object 10 in space which may be either enemy or friendly. A hovering-type satellite interceptor, having a circuit shown between the dot-dash lines and identified by the reference character 11, has a matrix camera 13 on which is fixed or attached flash light source 14. The matrix camera 13 is one more particularly shown in FIG. 2 and will be described in more detail with reference to that figure. The matrix camera 13 is stabilized in space by a camera stabilization means 15 which may be of any well known type stabilization means into which guidance signals from a ground station may be applied by way of a radio link and then to the conductor means 16, as shown and described in the text *Principles of Guided Missile Design* by Grayson Merrill (1955) published by the D. Van Nostrand Company, Incorporated, Section 16-3. The output of the matrix camera 13 is applied to a data transmitter 17 which may be of any well known microwave transmitter type having a low gain antenna 18 controlled to be directed toward a ground station 12. A fuzing or proximity switching signal is applied by way of conductor means 19 through branch conductors 20 and 21 to the flash light source 14 and the data transmitter 17, respectively. The fuzing or switching signal may come from any well known device such as a proximity fuzing device which will be activated whenever a satellite such as 10 approaches a predetermined range within view of the matrix camera. This fuzing signal will also activate the data transmitter to transmit signals from the matrix camera through the low gain antenna earthward to the ground station 12 where they will be received through the high gain antenna 25 to the data receiver 26 where these signals are processed and displayed or recorded in the recorder 27. Observers at the ground station can then observe satellite 10 through the matrix camera in a reconstructed picture in recorder 27. The picture data can be transmitted to the ground station by any well known telemetering system; however, a digital transmission link of the type discussed in the text "Telemetry Systems" by LeRoy E. Foster, John Wiley & Sons, Inc., N.Y. Publisher (1965) Chaper 1, and 4, are preferred.

Referring more particularly to FIG. 2, an exploded view of a matrix camera is shown with four matrix elements although the invention is not limited to the use of a matrix camera with four matrix elements since a larger number of matrix elements may be used where the need arises. A main lens 30 receives light reflections from an object, such as satellite 10, when the flash light 14 is activated, this main lens 30 having a focal plane at the matrix 31 dividing the scene into quadrants by the matrix divisions 32, 33, 34, and 35. Each of the four quadrants has auxiliary lenses 36,37, the only two shown since the matrix 31 blots out the other two. The focal plane of the four auxiliary lenses lies on the image pickup tube surface 38 of an image pickup tube 39. The image pickup tube 39 is deliberately made very insensitive to sunlight, starlight, or sunlight and starlight reflections by filters, or the like, so that neither the star background nor the sunlight on the satellite 10 will cause any electrical output of the image pickup tube 39. When the flash light source 14 is activated, satellite 10 will be illuminated to sufficient brightness to charge the image tube 39 and have its image stored on the image tube surface 38. After the image tube surface 38 is exposed, the information is retained as a charge until readout. While special storage type image tubes (such as the Westinghouse Permachon) are available it will probably not be necessary to use such a tube since a standard vidicon can be operated in such a way that the charge on the vidicon target is retained until readout by the scanning system. A matrix camera is used because it will provide a wide field of view without loss of resolution.

Referring more particularly to FIG. 3 the satellite 10 image is directed through the main lens 30 and auxiliary lens 36,37 to be imaged on the focal plane 38 of the image tube 39, as shown in this figure, with the quadrants marked off in dotted lines. The camera stabilization means 15 stabilizes the camera 13 in such a way that the satellite image is focused into the lower left corner of 38 and the image moves across the surface 38 toward the upper righthand corner before intercept. The advantage of the matrix camera is that the resolution of each of the four sub-images, as shown in FIG. 3, is equal to that of the electronic scanning system of the image pickup tube 39. The data transmitter 17 transmits the image as shown in FIG. 4 and this image is reconstructed in the data receiver 26 and recorded on 27 as shown in FIG. 5.

Since the velocities of satellites are so high, the duration of the light flash from the flash light source 14 must be extremely short. As may be seen in FIG. 6 the limitations of exposure time as a function of range with a matrix camera having field of view of 5° shows two examples of a miss distance of 10 feet and a miss distance of 100 feet to indicate that the exposure time should be not less than 1.0 microsecond or more than about 5.0 microseconds to assure a smear-free picture under all practical conditions. Light sources for the source 14 of extreme brightness and very short duration have become available recently in the form of Xenon flash tubes.

Figure 7:
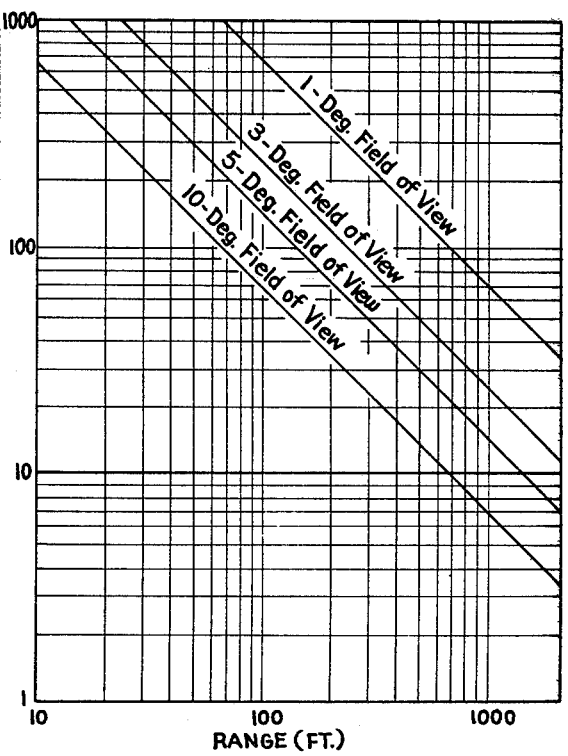

FIG. 7 shows as a function of range the resolution in lines per satellite diameter that would be obtained with the system for a resolution of 600 lines and fields of view of 1°, 3°, 5°, and 10°.

Figure 8:
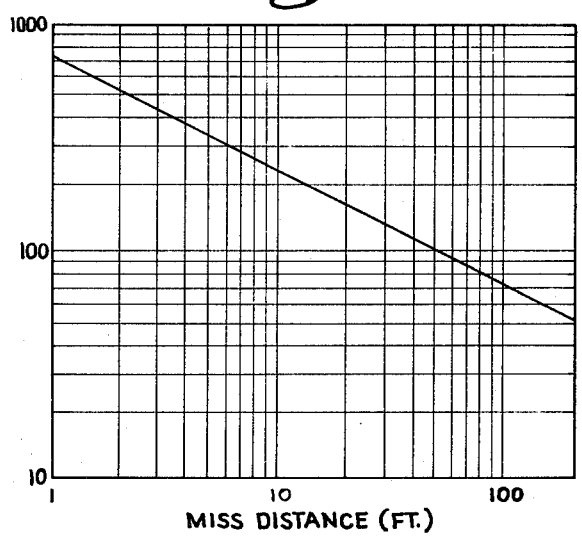
Figure 9:
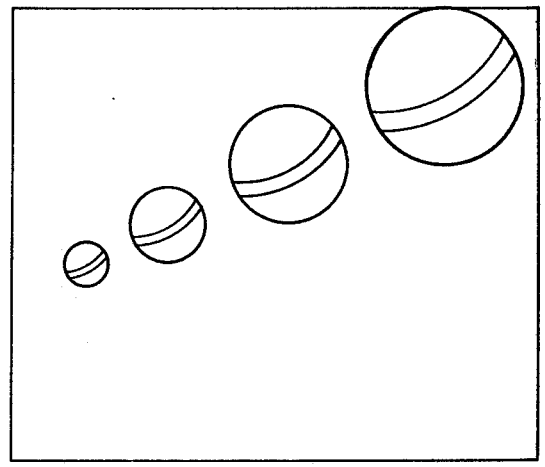
FIG. 9 illustrates multiple images of the satellite due to multiple exposure.

FIG. 8 shows the resolution that would be obtained with the same system for FIG. 7 as a function of the miss distance. The values given in this figure assume optimum orientation of the matrix camera 13 with respect to the satellite 10. From this figure it can be seen that at a miss distance of 50 feet the resolution would be 107 lines per satellite diameter. It has been found that a good amount of detail can be seen where the resolution is approximately 100 lines per satellite diameter.

Where more than one image pickup tube could be used it would be possible to obtain a rather large field of view at high resolution without overlap of the satellite sub-images since the backgrounds can be allowed to overlap in view of this overlap being in the black area. For example, with a dual imaging tube system a multiple exposure technique could readily be used which would provide multiple images of the satellite, as seen in FIG. 9, thus relaxing the requirements of the fuzing or proximity switching signals over the conductor means 19.

The readout of the image pickup tube 39 by the electronic scanning system is by scan at a very low frame rate to allow use of a very narrow bandwidth for the transmission to ground, since it is desirable to finish the transmission by the time the interceptor re-enters the atmosphere, when plasma effect can cause difficulties. For the information transmission, a transmission time of three minutes is allowed. The transmission frequency has been selected on the basis of optimum transmission characteristics for a space-to-ground link. The parameters of the data transmission link for a transmitter power of 10 watts may be the following:

Resolution elements per image tube: $3.6 \times 10^5$

Total data elements, including synchronization, for two image tubes: $8.6 \times 10^5$ Required video bandwidth (three minute transmission time): 2.4 Kilocycles Range of Data Link: 2000 Nautical Miles Transmission frequency: Approx. 2 Gigacycles Space attenuation: $-170$ Decibels Interceptor Antenna Gain: 0 Decibels Ground station antenna gain (2 ft. dish): 20 Decibels Receiver Noise Figure: 10 Decibels Receiver Noise Power: $-160$ dbw System Losses: 10 Decibels Signal-to-Noise ratio at receiver output: 10 Decibels The signal to noise ratio could be increased to as much as 20 Decibels with a coded digital transmission data link. With such a satellite inspection system using a hovering-type interceptor, the object or enemy satellite in space can be observed accurately in minutes from a ground station.

While many modifications and changes may be made in the constructional details and features of this invention it is to be understood that I desire to be limited in the spirit of my invention only by the scope of the appended claims.

I claim:

1. A satellite inspection system for use in hovering-type satellite interceptors comprising:

an electro-optical camera in a satellite interceptor having image tube means for receiving the reflected rays of an object in space and for producing electrical outputs representative of the object from the beam scanning readout of the image tube means, said electro-optical camera being a matrix camera having the focal plane thereof divided into quarter sections, each quarter section having an auxiliary lens to focus the image of an object on said camera image tube thereby providing four matrices, each with a resolution equivalent to the resolution of the image tube scanning system;

means coupled to said camera for stabilizing same and for receiving guidance signals on an input thereto;

a high intensity flash light source coupled to said camera to expose intercepted objects to light for reflection of the object on said camera image tube means;

a data transmitter coupled to said electrical outputs of said camera image tube means for transmitting said electrical outputs as electromagnetic signals;

a low gain antenna coupled to said transmitter for transmitting said electromagnetic signals groundward;

a fuzing proximity switching signal input coupled to said flash light source and to said data transmitter to cause flash light and transmission activity when an object is intercepted at a predetermined range;
a ground receiver station remote from said interceptor having a high gain antenna directed to receive the transmission from said satellite interceptor; and
an electro-optical receiver in said ground receiver station for transforming said electromagnetic signals into an optical image of said intercepted object whereby rapid televised information of an intercepted object in space is relayed to ground for observation.

2. A satellite inspection system as set forth in claim 1 wherein said image tube means comprises a single image tube.

* * * * *